United States Patent
Su

(10) Patent No.: US 12,204,636 B2
(45) Date of Patent: Jan. 21, 2025

(54) METHOD, APPARATUS, CHIP AND MODULE DEVICE FOR TEMPORARY PASSWORD MANAGEMENT

(71) Applicant: Shenzhen Kaadas Intelligent Technology Co., Ltd., Guangdong (CN)

(72) Inventor: Qiyun Su, Guangdong (CN)

(73) Assignee: SHENZHEN KAADAS INTELLIGENT TECHNOLOGY CO., LTD., Guangdong (CN)

( * ) Notice: Subject to any disclaimer, the term of this patent is extended or adjusted under 35 U.S.C. 154(b) by 226 days.

(21) Appl. No.: 18/109,415

(22) Filed: Feb. 14, 2023

(65) Prior Publication Data

US 2024/0193258 A1    Jun. 13, 2024

(30) Foreign Application Priority Data

Dec. 7, 2022    (CN) .......................... 202211578915.1

(51) Int. Cl.
*G06F 21/45*    (2013.01)
*H04L 9/08*    (2006.01)

(52) U.S. Cl.
CPC ............ *G06F 21/45* (2013.01); *H04L 9/0863* (2013.01)

(58) Field of Classification Search
None
See application file for complete search history.

(56) References Cited

U.S. PATENT DOCUMENTS

| 2016/0269398 A1* | 9/2016 | Chhabra | H04L 63/0838 |
| 2019/0373469 A1* | 12/2019 | Bradley | H04W 12/069 |
| 2021/0243207 A1* | 8/2021 | Crume | G06F 16/2255 |

FOREIGN PATENT DOCUMENTS

| CN | 109741500 A | * | 5/2019 | |
| WO | WO-2015020629 A1 | * | 2/2015 | G06F 8/654 |

\* cited by examiner

*Primary Examiner* — Benjamin E Lanier
(74) *Attorney, Agent, or Firm* — Scully, Scott, Murphy & Presser, P.C.

(57) ABSTRACT

A method for temporary password management, including: obtaining a first temporary password entered by a user; matching the first temporary password with temporary passwords in a valid temporary password pool; if the matching succeeds, performing an unlocking operation; moving a second temporary password from the valid temporary password pool to an invalid temporary password pool, the second temporary password being a temporary password matching the first temporary password in the valid temporary password pool; when a temporary password having a storage time exceeding a first time length threshold exists in the invalid temporary password pool, moving the temporary password in the invalid temporary password pool having a storage time exceeding the first time length threshold back to the valid temporary password pool.

20 Claims, 4 Drawing Sheets

METHOD, APPARATUS, CHIP AND MODULE DEVICE FOR TEMPORARY PASSWORD MANAGEMENT

CROSS-REFERENCE TO RELATED APPLICATION

The present application claims priority to Chinese Patent Application No. CN202211578915.1, filed on Dec. 7, 2022, the entire contents of which are incorporated by reference in their entirety for all purposes.

BACKGROUND

With the development of smart door locks, people no longer need to carry physical keys when they go out, which greatly facilitates people's lives. At present, the smart door locks on the market are mainly divided into networked door locks and non-networked door locks. For networked door locks, although the controlling password can be changed in real time, it cannot be used in case of poor network signals and network disconnections, and because the network needs to go through the server, there is a possibility of being hacked, and the security is not high. For non-networked door locks, when the owner is not at home and there is a visitor, the visitor will have to wait outside the door. Therefore, how to ensure safety while dealing with the situation of having guests when the host is not at home, has become a problem to be solved.

SUMMARY

The present disclosure relates to computer technologies, and especially related to a method, apparatus, chip and module device for temporary password management.

In accordance with one implementation, the present disclosure provides a method for temporary password management. The method includes: obtaining a first temporary password entered by a user; matching the first temporary password with temporary passwords in a valid temporary password pool; if the matching succeeds, performing an unlocking operation; moving a second temporary password from the valid temporary password pool to an invalid temporary password pool, the second temporary password being a temporary password matching the first temporary password in the valid temporary password pool; when a temporary password having a storage time exceeding a first time length threshold exists in the invalid temporary password pool, moving the temporary password in the invalid temporary password pool having a storage time exceeding the first time length threshold back to the valid temporary password pool. In some embodiments, the first time length threshold is determined based on a total number of temporary passwords and a maximum number of temporary passwords usable in a preset period. In some embodiments, the method includes: when a temporary password having a storage time exceeding a second time length threshold exists in the valid temporary password pool, moving the temporary password in the valid temporary password pool having a storage time exceeding the second time length threshold back to the invalid temporary password pool. In some embodiments, the method includes: obtaining a management password, the management password tied to a manager; based on the management password, N encryption numbers, and a door lock product serial number (SN number), generating N temporary passwords, the N encryption numbers being generated based on the SN number. In some embodiments, based on the management password, the N encryption numbers, and the SN number, generating the N temporary passwords, includes: based on the management password and the N encryption numbers, determining N encryption keys; using the N encryption keys to encrypt the SN number so as to obtain the N temporary passwords. In some embodiments, the method includes: obtaining a temporary password acquisition instruction; based on a sequence of temporary passwords in the valid temporary password pool, obtaining a third temporary password from the valid temporary password pool; displaying the third temporary password, the third temporary password being used to perform an unlock operation on door lock device, the third temporary password being the i-th temporary password in the valid temporary password pool, and the third temporary password being the temporary password displayed for the i+a*N times, wherein N is the total number of temporary passwords in the valid temporary password pool, a is a positive integer greater than or equal to zero. In some embodiments, the method includes: obtaining a management password, a door lock product serial number (SN number), and N encryption numbers provided by an application program; based on the management password, the N encryption numbers, and the SN number, generating N temporary passwords in the valid temporary password pool. In some embodiments, based on the management password, the N encryption numbers, and the SN number, generating N temporary passwords in the valid temporary password pool, includes: based on the management password and the N encryption numbers, determining N encryption keys; using the N encryption keys to encrypt the SN number so as to obtain the N temporary passwords.

In accordance with one implementation, the present disclosure provides a device for temporary password management. The device includes: an obtaining module, for obtaining a first temporary password entered by a user; a processing module, for matching the first temporary password with temporary passwords in a valid temporary password pool; the processing module is further configured for: if the matching succeeds, performing an unlocking operation; the processing module is further configured for: moving a second temporary password from the valid temporary password pool to an invalid temporary password pool, the second temporary password being a temporary password matching the first temporary password in the valid temporary password pool; the processing module is further configured for: when a temporary password having a storage time exceeding a first time length threshold exists in the invalid temporary password pool, moving the temporary password in the invalid temporary password pool having a storage time exceeding the first time length threshold back to the valid temporary password pool. In some embodiments, the obtaining module is further configured for: obtaining a temporary password acquisition instruction; the processing module is further configured for: based on a sequence of temporary passwords in the valid temporary password pool, obtaining a third temporary password from the valid temporary password pool; the processing module is further configured for: displaying the third temporary password, the third temporary password being used to perform an unlock operation on door lock device, the third temporary password being the i-th temporary password in the valid temporary password pool, and the third temporary password being the temporary password displayed for the i+a*N times, wherein N is the total number of temporary passwords in the valid temporary password pool, a is a positive integer greater than or equal to zero. In some embodiments, the first time length threshold is determined based on a total number of temporary passwords and a maximum number of temporary passwords usable in a preset period. In some embodiments, the processing module is further configured for: when a temporary password having a storage time exceeding a second time length threshold exists in the valid temporary password pool, moving the temporary password in the valid temporary password pool having a storage time exceeding the second time length threshold back to the invalid temporary password pool. In some embodiments, the processing module is further configured for: obtaining a management password, the management password tied to a manager; based on the management password, N encryption numbers, and a door lock product serial number (SN number), generating N temporary passwords, the N encryption numbers being generated based on the SN number. In some embodiments, based on the management password, the N encryption numbers, and the SN number, generating the N temporary passwords, includes: based on the management password and the N encryption numbers, determining N encryption keys; using the N encryption keys to encrypt the SN number so as to obtain the N temporary passwords.

In accordance with one implementation, the present disclosure provides a chip including a processor and a communication interface, the processor being configured to make the chip perform operations: obtaining a first temporary password entered by a user; matching the first temporary password with temporary passwords in a valid temporary password pool; if the matching succeeds, performing an unlocking operation; moving a second temporary password from the valid temporary password pool to an invalid temporary password pool, the second temporary password being a temporary password matching the first temporary password in the valid temporary password pool; when a temporary password having a storage time exceeding a first time length threshold exists in the invalid temporary password pool, moving the temporary password in the invalid temporary password pool having a storage time exceeding the first time length threshold back to the valid temporary password pool. In some embodiments, the processing is further configured to make the chip perform operations: obtaining a temporary password acquisition instruction; based on a sequence of temporary passwords in the valid temporary password pool, obtaining a third temporary password from the valid temporary password pool; displaying the third temporary password, the third temporary password being used to perform an unlock operation on door lock device, the third temporary password being the i-th temporary password in the valid temporary password pool, and the third temporary password being the temporary password displayed for the i+a*N times, wherein N is the total number of temporary passwords in the valid temporary password pool, a is a positive integer greater than or equal to zero. In some embodiments, the first time length threshold is determined based on a total number of temporary passwords and a maximum number of temporary passwords usable in a preset period. In some embodiments, the operations includes: when a temporary password having a storage time exceeding a second time length threshold exists in the valid temporary password pool, moving the temporary password in the valid temporary password pool having a storage time exceeding the second time length threshold back to the invalid temporary password pool. In some embodiments, the operations includes: obtaining a management password, the management password tied to a manager; based on the management password, N encryption numbers, and a door lock product serial number (SN number), generating N temporary passwords, the N encryption numbers being generated based on the SN number.

BRIEF DESCRIPTION OF THE DRAWINGS

The drawings are provided to illustrate example embodiments described herein and are not intended to limit the scope of the present disclosure.

DETAILED DESCRIPTION

Figure 1:
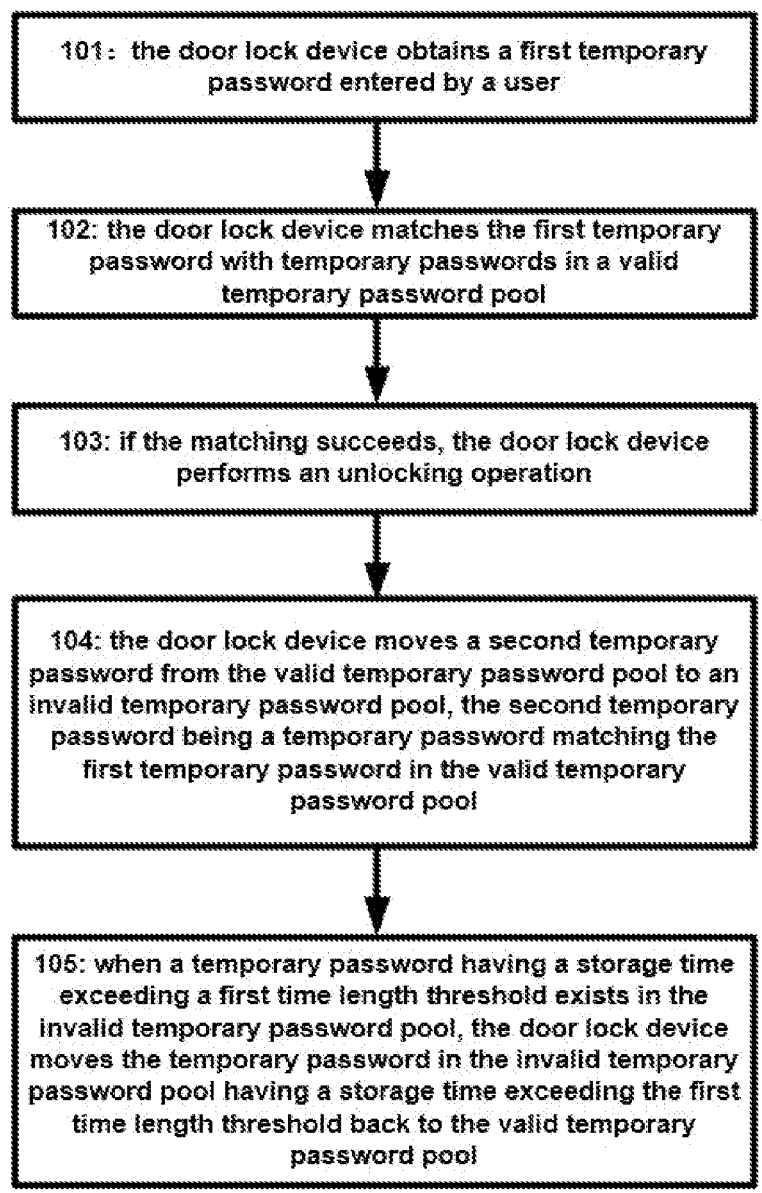
FIG. 1 is a flowchart diagram illustrating a method for temporary password management.

The accompanying drawings in the embodiments of the present application will be referenced to clearly and completely describe the technical solution in the embodiments of the present application. The described embodiments are only a portion of the embodiments of the present invention, but not all embodiments. Based on embodiments in the present invention, all other embodiments obtained by those of ordinary skill in the art without making creative labor, fall within the scope of protection of the present invention.

The terms used in the following embodiments of the present application are only for the purpose of describing specific embodiments, and are not intended to limit the present application. As used in the description of the present application and the appended claims, the singular expression "a", "an", "the", and similar terms are intended to also include the plural expression, unless contrary to express indication in the context. It should also be understood that the term "and/or" as used in this application refers to and includes any or all possible combinations of one or more of the listed items.

It should be noted that, within the description, the claims, and the drawings of the present application, terms like "first", "second", "third" and similar are used to distinguish similar objects, and do not have to be used to describe a specific order or sequence. It should be understood that the data so used may be interchangeable where appropriate so that embodiments of the present application described herein may be implemented in an order other than those illustrated or described herein. Further, the terms "comprising" and "including" and any variation thereof is intended to cover non-exclusive inclusions, for example, a process, method, system, product or service including a series of steps or units need not be limited to those steps or units expressly listed, but may include other steps or units not clearly listed or inherent to those processes, methods, products or equipment.

In order to facilitate understanding of the solutions provided in the implementations of this application, some technical terms involved in this application are described below:

I. Terminal Devices

Terminal devices include devices that provide voice and/or data connectivity to users. For example, a terminal device may be a wireless transceiver capable device that can be deployed on land, including indoor or outdoor, handheld, wearable, or in-vehicle. They can also be deployed on water (e.g. ships). They can also be deployed in the air (such as on airplanes, balloons, satellites). Terminals can be mobile phones, tablets (Pad), computers with wireless transceiver capabilities, virtual reality (VR) terminal devices, augmented reality (AR) terminal devices, wireless terminals in industrial control, vehicle terminal devices, wireless terminals in self-driving, wireless terminals in remote medical, wireless terminals in smart grid, and wireless terminals in transportation safety, wireless terminals in smart city, wireless terminals in smart home, wearable terminal devices, and so on. The implementations of this application do not restrict the application scenarios. Terminals are sometimes referred to as terminal devices, user equipment (UE), access terminal devices, vehicle-mounted terminals, industrial control terminals, UE units, UE stations, mobile stations, mobile stations, remote stations, remote terminal devices, mobile devices, UE terminal devices, wireless communication devices, UE agents or UE devices. Terminals can also be fixed or mobile. In the embodiments of the application, the device used to implement the function of a terminal device can be either a terminal device or a device capable of supporting the realization of the functions of a terminal device, such as a chip system or a combination of devices and components that can implement the function of a terminal device, which can be installed in a terminal device.

II. Door Lock Device

Door lock devices include smart door locks, which are improved on the basis of traditional mechanical locks and are more intelligent and simpler in terms of user safety, identification, and management. Smart door lock is the executing part of the door lock in the access control system.

Referring to FIG. 1, FIG. 1 is a flowchart diagram illustrating a method for temporary password management. The method for temporary password management includes step 101 through step 105. The execution body for the method shown in FIG. 1 can be a door lock device or a chip in a door lock device. Optional, door lock device can be home smart door, safe door, etc. The implementation scenario for the method shown in FIG. 1 may take a door lock device as an example.

Step 101: the door lock device obtains a first temporary password entered by a user.

A first temporary password is used to unlock the door lock device. Usually a first temporary password is formed by multiple numbers. The user can be a temporary visitor other than the manager of the door lock device. The user can enter the first temporary password through the keyboard on the door lock device, which can be either a virtual keyboard or a physical keyboard.

Step 102: the door lock device matches the first temporary password with temporary passwords in a valid temporary password pool.

The temporary password in the valid temporary password pool is part of the temporary password generated by the door lock device after the door lock device manager has purchased the door lock and bound the door lock to the door lock device.

Step 103: if the matching succeeds, the door lock device performs an unlocking operation.

If the first temporary password is the same as any of the temporary passwords in the valid temporary password pools, the matching succeeds and the door lock device performs the unlocking operation. If a temporary password pool does not have the same temporary password as the first temporary password, matching fails and the door lock device does not perform the unlocking operation. For example, the first temporary password is 14321, and three temporary passwords included in the valid temporary password pool are temporary password 1 (12345), temporary password 2 (54123), and temporary password 3 (14321). It is noted that the first temporary password matches the temporary password 3 in the valid temporary password pool, and the door lock device performs the unlocking operation.

Step 104: the door lock device moves a second temporary password from the valid temporary password pool to an invalid temporary password pool, the second temporary password being a temporary password matching the first temporary password in the valid temporary password pool.

The second temporary password is the temporary password in the valid temporary password pool which matches the first temporary password successfully. For example, the first temporary password is 14321, and three temporary passwords included in the valid temporary password pool are temporary password 1 (12345), temporary password 2 (54123), and temporary password 3 (14321). It is noted that the second temporary password is temporary password 3 (14321), and one may move temporary password 3 from the valid temporary password pool to the invalid temporary password pool.

It should be noted that if the first temporary password matches a temporary password of the invalid temporary password pool successfully, the door lock device cannot perform the unlocking operation. Any temporary password in the invalid temporary password pool is different from any temporary password in the valid temporary password pool. The sum of the number of temporary passwords in the valid temporary password pool and the number of temporary passwords in the invalid temporary password pool is a total number of temporary passwords generated by the door lock device.

In one possible implementation manner, when a temporary password having a storage time exceeding a second time length threshold exists in the valid temporary password pool, the door lock device moves the temporary password in the valid temporary password pool having a storage time exceeding the second time length threshold back to the invalid temporary password pool.

The second time length threshold could be a preset value, like three days, a week, a month, etc.

As an example, the second time length threshold is 30 days, and three temporary passwords in the valid temporary password pool are: temporary password 1, temporary password 2, and temporary password 3. Temporary password 1 is stored in the valid temporary password pool for 2 days, temporary password 2 is stored in the valid temporary password pool for 31 days, and temporary password 3 is stored in the valid temporary password pool for 7 days. It is noted that the temporary password 2 is stored in the valid temporary password pool longer than the second time length threshold, the temporary password 2 is moved from the valid temporary password pool to the invalid temporary password pool.

In one possible implementation manner, every other preset cycle, the door lock device filters the temporary passwords in the valid temporary password pool for temporary passwords that have been stored longer than the second time length threshold. For example, on a daily basis the door lock device filters temporary passwords in the valid temporary password pool.

In other words, there are two cases in which the door lock device moves the temporary password in the valid temporary password pool to the invalid temporary password pool. In one case, the temporary password in the valid temporary password pool has been used (matching succeeds and the unlocking operation is performed). In another case, the temporary password is stored in the valid temporary password pool for too long (beyond the second time length threshold).

Step 105: when a temporary password having a storage time exceeding a first time length threshold exists in the invalid temporary password pool, the door lock device moves the temporary password in the invalid temporary password pool having a storage time exceeding the first time length threshold back to the valid temporary password pool.

In one possible implementation manner, the first time length threshold is determined based on a total number of temporary passwords and a maximum number of temporary passwords usable in a preset period.

In other words, in order to ensure that temporary passwords always exist in the valid temporary password pool and to avoid that the unlocking functions of temporary passwords cannot be used due to the valid temporary password pool being empty, the first time length threshold is determined based on a total number of temporary passwords and a maximum number of temporary passwords usable in a preset period. For example, if one allows five temporary passwords to be used in a day, with a total of 100 temporary passwords, the first time length threshold must not exceed 100/5=20 days. It should be noted that the first time length threshold can be 20 days or less, such as 17 days, 18 days, etc.

By using above method, the first temporary password is matched with the temporary password in the local valid temporary password pool of the door lock device, and there is no need to use networking to realize using the temporary password to perform the unlocking operation, thereby improving security. And the temporary password in the valid temporary password pool is cycled with the temporary password in the invalid temporary password pool, without having to manually add the temporary password in the door lock device multiple times, thereby improving convenience.

The above method explains in details the application phase of the temporary password management method provided by this application. The temporary password management method provided by this application also includes the generation phase of temporary password. The following explains the generation phase of temporary password provided by the temporary password management method provided by this application, which includes but is not limited to the following two steps.

Step one, the door lock device obtains a management password, the management password tied to a manager.

The management password is the unique password for the manager of the door lock device. Different managers have different management passwords, which can be assigned by the owner for the manager or set by the manager himself. It should be noted that if the management password is set by a manager, it needs to be verified that the management password of the setting whether has been used by other managers and that the management password meets the format requirements.

In one possible implementation manner, after the manager has purchased the door lock device, the management password is input to the door lock device by the manager or shop staff when binding to the door lock device.

Step two, based on the management password, N encryption numbers, and a door lock product serial number (SN number), the door lock device generates N temporary passwords, the N encryption numbers being generated based on the SN number.

Figure 2:
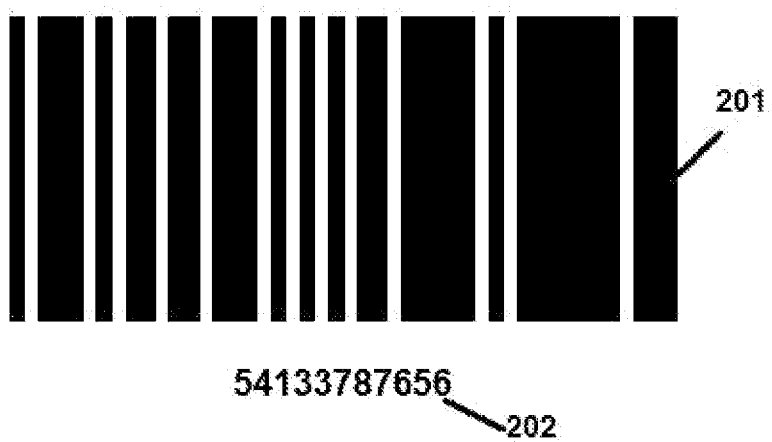
FIG. 2 is a block diagram illustrating a SN number.

The SN number is the unique number of the door lock device. Different door lock devices have different SN numbers. The SN number can be in the form of SN barcodes, or in the form of numbers, or a combination of the two. As shown in FIG. 2, the image marked in FIG. 2 with reference number 201, is in the form of SN barcodes, the content marked in FIG. 2 with the reference number 202 is in the form of numbers, and FIG. 2 as a whole is a combination of the two forms. It is noted that when an SN number is in the form of a number, it can also include letters, etc., and is not necessarily limited to numbers only. Since the SN number is unique to the door lock device, and N encryption numbers are determined based on the SN number, the N encryption numbers are also unique to the door lock device, and the N encryption numbers are different for different door lock devices.

With above implementations, because the temporary password is generated based on the SN number, it ensures that N temporary passwords generated by different door lock devices are different, thereby ensuring the security of door lock devices. Because the management password is a unique password for managers, it ensures the privacy of N temporary passwords and the security of door lock devices.

In one possible implementation manner, based on the management password, the N encryption numbers, and the SN number, the door lock device generates the N temporary passwords, specifically: the door lock device, based on the management password and the N encryption numbers, determines N encryption keys; the door lock device uses the N encryption keys to encrypt the SN number so as to obtain the N temporary passwords.

In other words, the door lock device determines different N encryption keys based on the management password and the N encryption numbers, and then uses the encryption key to encrypt the SN number to obtain N different temporary passwords.

Figure 3:
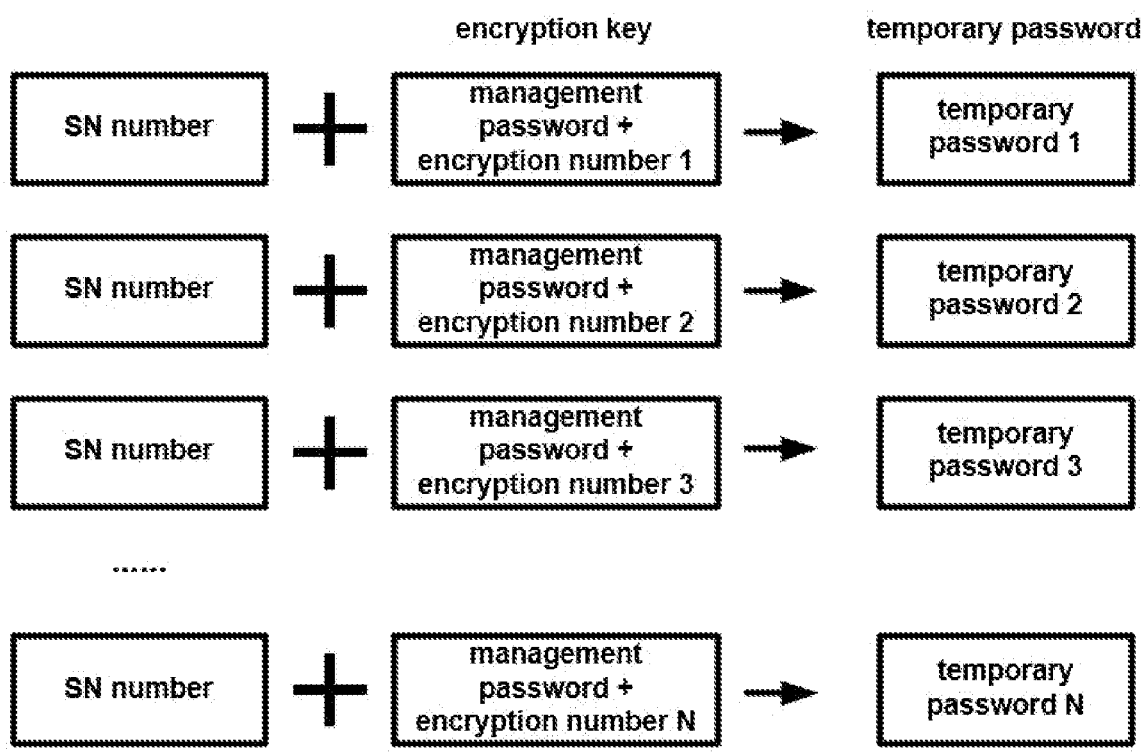
FIG. 3 is a block diagram illustrating the generating of temporary passwords.

For example, as shown in FIG. 3, encryption key 1 is generated from the management password and encryption number 1, and then the SN number is encrypted based on the encryption key 1 to obtain temporary password 1. Encryption key 2 is generated from the management password and encryption number 2, and then the SN number is encrypted based on the encryption key 2 to obtain temporary password 2. It may be repeated in this way.

In one possible implementation manner, the encryption key generated by the management password and the encryption number can be a string that connects the management password to the encryption number as the encryption key. For example, if a management password is 12345 and encryption number 1 is a54b12, encryption key 1 can be 12345a54b12, and if the management password is 12345 and encryption number 1 is 542a32, encryption key 1 can be 12345542a32. It should be noted that encryption keys are not limited to the above methods, but can be obtained in other forms without restriction.

In one possible implementation manner, the door lock device uses N encryption keys to apply Hash encryption to the door lock product serial number, i.e., the SN number.

With above implementations, using N encryption keys to encrypt the SN number to obtain N temporary passwords, thereby improving the security of the door lock device.

Figure 4:
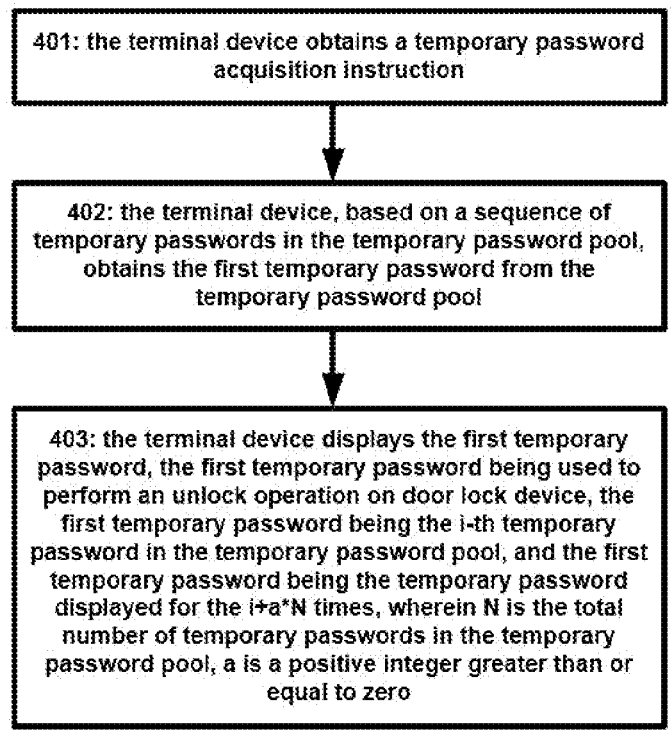
FIG. 4 is a flowchart diagram illustrating another method for temporary password management.

Referring to FIG. 4, FIG. 4 is a flowchart diagram illustrating another method for temporary password management. The method for temporary password management includes step 401 through step 403. The execution body for the method shown in FIG. 4 can be a terminal device or a chip in a terminal device. Optionally, terminal devices can be mobile phones, tablets (Pad), computers with wireless transceiver capabilities, virtual reality (VR) terminal devices, augmented reality (AR) terminal devices, wireless terminals in industrial control, vehicle terminal devices, wireless terminals in self-driving, wireless terminals in remote medical, wireless terminals in smart grid, and wireless terminals in transportation safety, wireless terminals in smart city, wireless terminals in smart home, wearable terminal devices, and so on. The execution body for the method in FIG. 4 are exemplified by a terminal device.

Step 401: the terminal device obtains a temporary password acquisition instruction.

The temporary password acquisition instruction is issued by the manager. If the manager clicks on the temporary password display button, the terminal device receives the temporary password acquisition instruction, which instructs the terminal device to determine the first temporary password from the temporary password and display the first temporary password for the manager.

Step 402: the terminal device, based on a sequence of temporary passwords in the temporary password pool, obtains the first temporary password from the temporary password pool.

Temporary passwords in the temporary password pool are listed in the order in which they are generated. To obtain temporary passwords, one need to obtain them in that order.

Figure 5:
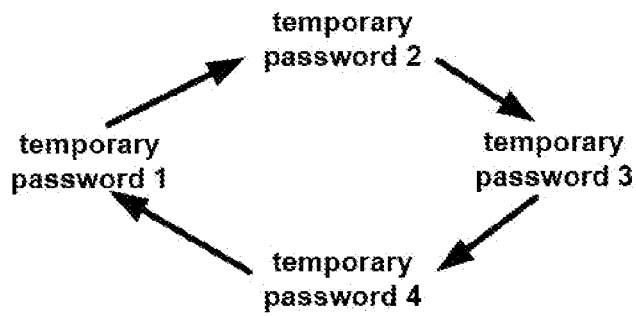
FIG. 5 is a block diagram illustrating the cycle of temporary passwords.

For example, temporary passwords in the temporary password pool are listed in the order: temporary password 1, temporary password 2, temporary password 3, and temporary password 4. As shown in FIG. 5, when the temporary password acquisition instruction is received for the first time, one selects temporary password 1 as the first temporary password from the temporary password pool; when the temporary password acquisition instruction is received for the second time, one selects temporary password 2 as the first temporary password from the temporary password pool; when the temporary password acquisition instruction is received for the third time, one selects temporary password 3 as the first temporary password from the temporary password pool; when the temporary password acquisition instruction is received for the fourth time, one selects temporary password 4 as the first temporary password from the temporary password pool; when the temporary password acquisition instruction is received for the fifth time, one selects temporary password 1 as the first temporary password from the temporary password pool; when the temporary password acquisition instruction is received for the sixth time, one selects temporary password 2 as the first temporary password from the temporary password pool. The pattern may be repeated accordingly. It is noted that, after the temporary password from the temporary password pool is obtained, the cycle is repeated following the sequence from the first temporary password.

Step 403: the terminal device displays the first temporary password, the first temporary password being used to perform an unlock operation on door lock device, the first temporary password being the i-th temporary password in the temporary password pool, and the first temporary password being the temporary password displayed for the i+a*N times, wherein N is the total number of temporary passwords in the temporary password pool, a is a positive integer greater than or equal to zero.

When the temporary password in the temporary password pool is first cycled, a is 0; for the second iteration of the temporary password in the temporary password pool, a is 1, and so on. That is, the terminal device displays temporary passwords in a circular way. For example, the first password in the first cycle is temporary password 1, and the first password in the second cycle is temporary password 1. It is noted that any cycle of temporary passwords requires all passwords in the password pool to be cycled before the next temporary password cycle occurs, that is, the number of temporary passwords in each cycle is the same, and the number of temporary passwords in each cycle is the number of temporary passwords in the temporary password pool.

In one possible implementation manner, If the temporary password displayed or obtained by the terminal device during the preset time exceeds the maximum number of temporary passwords that can be used, the terminal device no longer obtains the temporary password from the temporary password pool within the preset time and displays the prompt for the maximum temporary password limit. For example, if the preset time is one day and the maximum number of temporary passwords that can be used is five, when the number of temporary passwords used in a day exceeds five, the terminal device will no longer obtain the temporary password from the temporary password pool within that preset time and will display a prompt for the maximum temporary password limit.

Above methods explain in detail the application phase of the temporary password management method provided by this application. The temporary password management method provided by this application also includes the generation phase of temporary password. The following explains the generation phase of temporary password provided by the temporary password management method provided by this application, which includes but is not limited to the following two steps.

Step one, the terminal device obtains a management password, the management password tied to a manager.

The details may be referenced with the description of step 105 above, and not repeated here.

Step two, based on the management password, N encryption numbers, and a door lock product serial number (SN number), the terminal device generates N temporary passwords, the N encryption numbers being generated based on the SN number.

In one possible implementation manner, based on the management password, the N encryption numbers, and the SN number, the terminal device generates the N temporary passwords, specifically: the terminal device obtains the management password, the door lock product serial number (SN number) and N encryption numbers provided by application program; based on the management password, the N encryption numbers, and the door lock product serial number (SN number) generate N temporary passwords in the temporary password pool.

The details may be referenced with the description of step 105 above. The manner of obtaining the SN number may be divided in two ways: when the SN number is in the form of barcode as indicated by reference number 201 in FIG. 2 or a combination as indicated by the whole FIG. 2, one may use the terminal device to scan the barcode to obtain the SN number; when the SN number is in the form of number as indicated by reference number 202 in FIG. 2 or a combination as indicated by the whole FIG. 2, the manager may manually enter the number into the terminal device to obtain the SN number.

Figure 6:
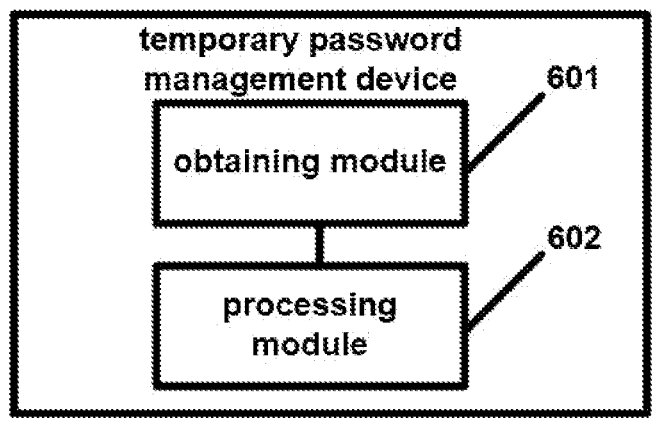
FIG. 6 is a block diagram illustrating a device for temporary password management.

Referring to FIG. 6, FIG. 6 is a block diagram illustrating a device for temporary password management. The temporary password management device may be used to perform some or all of the functions of the door lock device in the embodiments of the above method. The device can be a door lock device, a device in a door lock device, or a device that can be used in conjunction with the terminal device. The temporary password device may also be a chip system. The temporary password management device shown in FIG. 6 includes a obtaining module 601 and a processing module 602.

The obtaining module 601, is configured for obtaining a first temporary password entered by a user.

The processing module 602 is configured for matching the first temporary password with temporary passwords in a valid temporary password pool.

The processing module 602 is further configured for: if the matching succeeds, performing an unlocking operation;

The processing module 602 is further configured for: moving a second temporary password from the valid temporary password pool to an invalid temporary password pool, the second temporary password being a temporary password matching the first temporary password in the valid temporary password pool;

The processing module 602 is further configured for: when a temporary password having a storage time exceeding a first time length threshold exists in the invalid temporary password pool, moving the temporary password in the invalid temporary password pool having a storage time exceeding the first time length threshold back to the valid temporary password pool.

In one possible implementation manner, the first time length threshold is determined based on a total number of temporary passwords and a maximum number of temporary passwords usable in a preset period.

In one possible implementation manner, when a temporary password having a storage time exceeding a second time length threshold exists in the valid temporary password pool, the processing module 602 is further configured for moving the temporary password in the valid temporary password pool having a storage time exceeding the second time length threshold back to the invalid temporary password pool.

In one possible implementation manner, the processing module 602 is further configured for obtaining a management password, the management password tied to a manager; the processing module 602 is further configured for, based on the management password, N encryption numbers, and a door lock product serial number (SN number), generating N temporary passwords, the N encryption numbers being generated based on the SN number.

In one possible implementation manner, the processing module 602 is further configured for, based on the management password, N encryption numbers, and a door lock product serial number (SN number), generating N temporary passwords, specifically: the processing module 602 is further configured for, based on the management password and the N encryption numbers, determining N encryption keys; the processing module 602 is further configured for, using the N encryption keys to encrypt the SN number so as to obtain the N temporary passwords.

The temporary password management device shown in FIG. 6 may also be used to perform some or all of the functions of the terminal device in the embodiment of the above method. The device may be a terminal device, a device in a terminal device, or a device that can be used in conjunction with the terminal device. The temporary password management device may also be a system on a chip.

The obtaining module 601 is configured for, obtaining a temporary password acquisition instruction.

The processing module 602 is configured for, based on a sequence of temporary passwords in the valid temporary password pool, obtaining a third temporary password from the valid temporary password pool.

The processing module 602 is further configured for, displaying the third temporary password, the third temporary password being used to perform an unlock operation on door lock device, the third temporary password being the i-th temporary password in the valid temporary password pool, and the third temporary password being the temporary password displayed for the i+a*N times, wherein N is the total number of temporary passwords in the valid temporary password pool, a is a positive integer greater than or equal to zero.

In one possible implementation manner, the obtaining module 601 is configured for, obtaining a management password, a door lock product serial number (SN number), and N encryption numbers provided by an application program.

The processing module 602 is further configured for, based on the management password, the N encryption numbers, and the SN number, generating N temporary passwords in the valid temporary password pool.

In one possible implementation manner, the processing module 602 is further configured for, based on the management password, the N encryption numbers, and the SN number, generating N temporary passwords in the valid temporary password pool, specifically: the processing module 602 is further configured for, based on the management password and the N encryption numbers, determining N encryption keys; the processing module 602 is further configured for, using the N encryption keys to encrypt the SN number so as to obtain the N temporary passwords.

Embodiments of the present application also provide a chip that may perform the relevant steps of the door lock device in the embodiments of above methods. The chip includes a processor and a communication interface, the processor is configured to enable the chip to perform a method according to any of the embodiments of method with reference to FIG. 1.

Embodiments of the present application also provides a chip that may perform the relevant steps of the terminal device in the embodiments of above methods. The chip includes a processor and a communication interface, the processor is configured to enable the chip to perform a method according to any of the embodiments of method with reference to FIG. 4.

Figure 7:
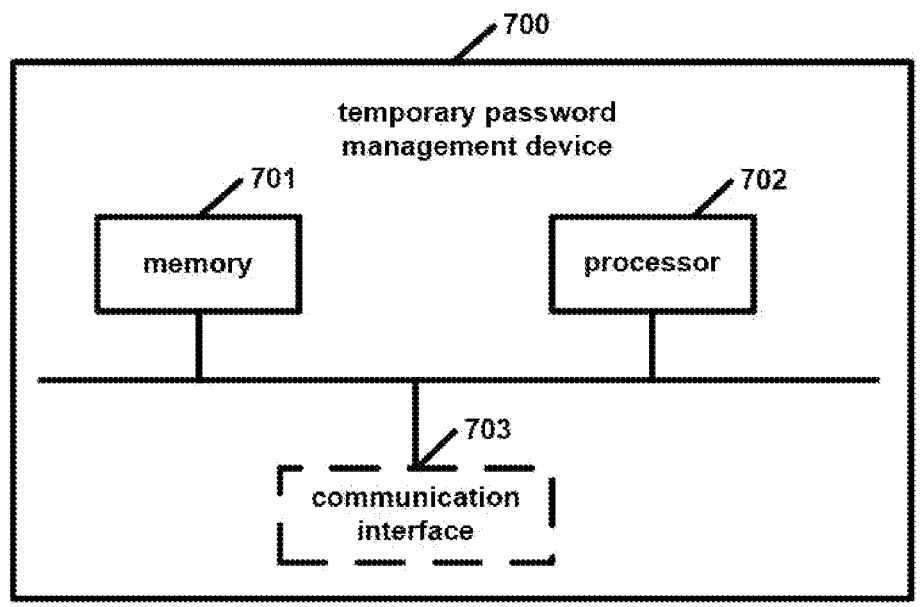
FIG. 7 is a block diagram illustrating another device for temporary password management.

Referring to FIG. 7, FIG. 7 is a block diagram illustrating another device for temporary password management. The temporary password management device 700 may be a door lock device or a terminal device. The temporary password management device 700 may include memory 701, processor 702. Optionally, the communication interface 703 is also included. Memory 701, processor 702, and communication interface 703 are connected via one or more communication buses. The communication interface 703 is controlled by the processor 702 for sending and receiving information.

Memory 701 may include read-only memory and random access memory, and provide instructions and data to the processor 702. A portion of the memory 701 may also include a non-volatile random access memory.

Communication interface 703 is configured for receiving or transmitting data.

The processor 702 may be a central processing module (CPU), the processor 702 may also be other general-purpose processors, digital signal processor (DSP), application specific integrated circuit (ASIC), Field-Programmable Gate Array (FPGA) or other programmable logic devices, discrete gate or transistor logic devices, discrete hardware components, etc. The general-purpose processor can be a microprocessor. Optional, the processor 702 can also be any regular processor, etc.

Memory 701 is configured for storing program instructions.

Processor 702 is configured for deploying program instructions stored in memory 701.

The processor 702 deploys the program instructions stored in the memory 701 so that the temporary password management device 700 executes the method executed by the door lock device or terminal device in the embodiments of above methods.

Figure 8:
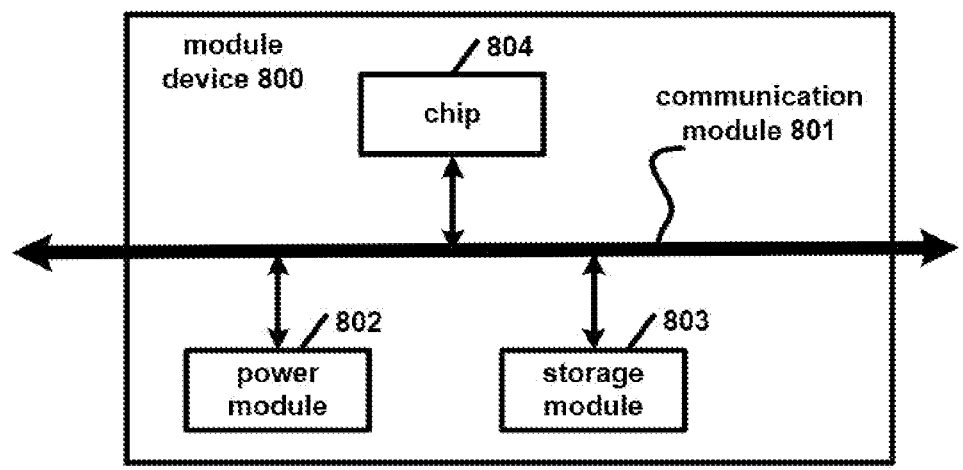
FIG. 8 is a structural diagram illustrating a moule device.

Referring to FIG. 8, FIG. 8 is a structural diagram illustrating a moule device. The module device 800 may perform the relevant steps of the door lock device or terminal device in the embodiments of above methods. The module device 800 includes: communication module 801, power module 802, storage module 803 and chip 804.

The power module 802 is configured for providing electric energy for the module device. The storage module 803 is configured for storing data and instructions. The communication module 801 is configured for communicating internally with the module device, or for the module device to communicate with an external device. The chip 804 is configured for performing the methods performed by the door lock device or terminal device in the embodiments of above methods.

It is noted that the embodiments of each device, chip, terminal device and module device in the embodiments of present application that are not mentioned in the corresponding embodiments and the specific implementation of each step may refer to the embodiments shown in FIG. 1 through FIG. 5 and the foregoing, and will not be repeated herein.

Embodiments of the present application also provide a computer-readable storage medium, the computer-readable storage medium stores instructions, when it is run on the processor, above method embodiments are implemented.

Embodiments of the present application also provide a computer program product, when the computer program product is running on the processor, above method embodiments are implemented.

The detailed embodiments provided in the present disclosure can be implemented by any one or a combination of hardware, software, firmware, or solid-state logic circuits, and can be implemented in combination with signal processing, control, and/or dedicated circuits. The equipment(s) or device(s) provided in the detailed embodiments of the present disclosure may include one or more processors (a microprocessor, a controller, a digital signal processor (DSP), an application specific integrated circuit (ASIC), a field programmable gate array (FPGA) and so on), and these processors process various computer-executable instructions to control the operations of the equipment(s) or device(s). The equipment(s) or device(s) provided in the detailed embodiments of the present disclosure may include a system bus or a data transmission system that couples various components together. The system bus may include any one of different bus structures or a combination of different bus structures, such as a memory bus or a memory controller, a peripheral bus, a universal serial bus, and/or a process or a local bus using any of a variety of bus architectures. The equipment(s) or device(s) provided in the detailed embodiments of the present disclosure may be provided separately, may also be a part of the system, or may be a part of other equipment or devices.

The detailed embodiments provided by the present disclosure may include a computer-readable storage medium or a combination with a computer-readable storage medium, such as one or more storage devices capable of providing non-transitory data storage. The computer-readable storage medium/storage device may be configured to store data, programmers and/or instructions, which when executed by the processor of the equipment(s) or device(s) provided in the present disclosure, would allow the equipment(s) or device(s) to implement related operations. The computer-readable storage medium/storage device may include one or more of the following characteristics: volatile, nonvolatile, dynamic, static, read/write, read-only, random access, sequential access, location addressability, file addressability and content addressability. In one or more exemplary embodiments, the computer-readable storage medium/storage device may be integrated into the equipment(s) or device(s) provided in the detailed embodiments of the present disclosure or belong to a public system. The computer-readable storage media/storage devices can include optical storage devices, semiconductor storage devices and/or magnetic storage devices, etc., and can also include random access memory (RAM), flash memory, read-only memory (ROM), erasable and programmable read-only memory (EPROM), electrically erasable programmable read-only memory (EEPROM), registers, hard disk, removable disk, recordable and/or rewritable compact disc (CD), digital versatile disc (DVD), large capacity storage medium device or any other form of suitable storage medium.

It will be appreciated that various of the above-disclosed embodiments and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for temporary password management, comprising:
    obtaining a first temporary password entered by a user;
    matching the first temporary password with temporary passwords in a valid temporary password pool;
    if the matching succeeds, performing an unlocking operation;
    moving a second temporary password from the valid temporary password pool to an invalid temporary password pool, the second temporary password being a temporary password matching the first temporary password in the valid temporary password pool; and
    when a temporary password having a storage time exceeding a first time length threshold exists in the invalid temporary password pool, moving the temporary password in the invalid temporary password pool having a storage time exceeding the first time length threshold back to the valid temporary password pool.

2. The method according to claim 1, the first time length threshold is determined based on a total number of temporary passwords and a maximum number of temporary passwords usable in a preset period.

3. The method according to claim 1, further comprising:
when a temporary password having a storage time exceeding a second time length threshold exists in the valid temporary password pool, moving the temporary password in the valid temporary password pool having a storage time exceeding the second time length threshold back to the invalid temporary password pool.

4. The method according to claim 2, further comprising:
when a temporary password having a storage time exceeding a second time length threshold exists in the valid temporary password pool, moving the temporary password in the valid temporary password pool having a storage time exceeding the second time length threshold back to the invalid temporary password pool.

5. The method according to claim 1, further comprising:
obtaining a management password, the management password tied to a manager; and
based on the management password, N encryption numbers, and a door lock product serial number (SN number), generating N temporary passwords, the N encryption numbers being generated based on the SN number.

6. The method according to claim 5, based on the management password, the N encryption numbers, and the SN number, generating the N temporary passwords, comprising:
based on the management password and the N encryption numbers, determining N encryption keys; and
using the N encryption keys to encrypt the SN number so as to obtain the N temporary passwords.

7. The method according to claim 1, further comprising:
obtaining a temporary password acquisition instruction;
based on a sequence of temporary passwords in the valid temporary password pool, obtaining a third temporary password from the valid temporary password pool; and
displaying the third temporary password, the third temporary password being used to perform an unlock operation on door lock device, the third temporary password being the i-th temporary password in the valid temporary password pool, and the third temporary password being the temporary password displayed for the i+a*N times, wherein N is the total number of temporary passwords in the valid temporary password pool, a is a positive integer greater than or equal to zero.

8. The method according to claim 7, further comprising:
obtaining a management password, a door lock product serial number (SN number), and N encryption numbers provided by an application program; and
based on the management password, the N encryption numbers, and the SN number, generating N temporary passwords in the valid temporary password pool.

9. The method according to claim 8, based on the management password, the N encryption numbers, and the SN number, generating N temporary passwords in the valid temporary password pool, comprising:
based on the management password and the N encryption numbers, determining N encryption keys; and
using the N encryption keys to encrypt the SN number so as to obtain the N temporary passwords.

10. A device for temporary password management, the device comprising:
an obtaining module, for obtaining a first temporary password entered by a user;
a processing module, for matching the first temporary password with temporary passwords in a valid temporary password pool;

the processing module is further configured for: if the matching succeeds, performing an unlocking operation;
the processing module is further configured for: moving a second temporary password from the valid temporary password pool to an invalid temporary password pool, the second temporary password being a temporary password matching the first temporary password in the valid temporary password pool; and
the processing module is further configured for: when a temporary password having a storage time exceeding a first time length threshold exists in the invalid temporary password pool, moving the temporary password in the invalid temporary password pool having a storage time exceeding the first time length threshold back to the valid temporary password pool.

11. The device according to claim 10,
the obtaining module is further configured for: obtaining a temporary password acquisition instruction;
the processing module is further configured for: based on a sequence of temporary passwords in the valid temporary password pool, obtaining a third temporary password from the valid temporary password pool; and
the processing module is further configured for: displaying the third temporary password, the third temporary password being used to perform an unlock operation on door lock device, the third temporary password being the i-th temporary password in the valid temporary password pool, and the third temporary password being the temporary password displayed for the i+a*N times, wherein N is the total number of temporary passwords in the valid temporary password pool, a is a positive integer greater than or equal to zero.

12. The device according to claim 10, the first time length threshold is determined based on a total number of temporary passwords and a maximum number of temporary passwords usable in a preset period.

13. The device according to claim 10, the processing module is further configured for: when a temporary password having a storage time exceeding a second time length threshold exists in the valid temporary password pool, moving the temporary password in the valid temporary password pool having a storage time exceeding the second time length threshold back to the invalid temporary password pool.

14. The device according to claim 10, the processing module is further configured for:
obtaining a management password, the management password tied to a manager; and
based on the management password, N encryption numbers, and a door lock product serial number (SN number), generating N temporary passwords, the N encryption numbers being generated based on the SN number.

15. The device according to claim 14, based on the management password, the N encryption numbers, and the SN number, generating the N temporary passwords, comprising:
based on the management password and the N encryption numbers, determining N encryption keys; and
using the N encryption keys to encrypt the SN number so as to obtain the N temporary passwords.

16. A chip comprising a processor and a communication interface, the processor being configured to make the chip perform operations:

obtaining a first temporary password entered by a user;

matching the first temporary password with temporary passwords in a valid temporary password pool;

if the matching succeeds, performing an unlocking operation;

moving a second temporary password from the valid temporary password pool to an invalid temporary password pool, the second temporary password being a temporary password matching the first temporary password in the valid temporary password pool; and when a temporary password having a storage time exceeding a first time length threshold exists in the invalid temporary password pool, moving the temporary password in the invalid temporary password pool having a storage time exceeding the first time length threshold back to the valid temporary password pool.

17. The chip according to claim 16, the processing is further configured to make the chip perform operations:

obtaining a temporary password acquisition instruction;

based on a sequence of temporary passwords in the valid temporary password pool, obtaining a third temporary password from the valid temporary password pool; and displaying the third temporary password, the third temporary password being used to perform an unlock operation on door lock device, the third temporary password being the i-th temporary password in the valid temporary password pool, and the third temporary password being the temporary password displayed for the i+a*N times, wherein N is the total number of temporary passwords in the valid temporary password pool, a is a positive integer greater than or equal to zero.

18. The chip according to claim 16, the first time length threshold is determined based on a total number of temporary passwords and a maximum number of temporary passwords usable in a preset period.

19. The chip according to claim 16, the operations comprising:

when a temporary password having a storage time exceeding a second time length threshold exists in the valid temporary password pool, moving the temporary password in the valid temporary password pool having a storage time exceeding the second time length threshold back to the invalid temporary password pool.

20. The chip according to claim 16, the operations comprising:

obtaining a management password, the management password tied to a manager; and based on the management password, N encryption numbers, and a door lock product serial number (SN number), generating N temporary passwords, the N encryption numbers being generated based on the SN number.

* * * * *